(12) United States Patent
Sakamoto

(10) Patent No.: US 11,534,700 B2
(45) Date of Patent: Dec. 27, 2022

(54) ION SUPPRESSOR AND ION CHROMATOGRAPH

(71) Applicant: Shimadzu Corporation, Kyoto (JP)

(72) Inventor: Katsumasa Sakamoto, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 394 days.

(21) Appl. No.: 16/629,385

(22) PCT Filed: Jul. 24, 2017

(86) PCT No.: PCT/JP2017/026737
§ 371 (c)(1),
(2) Date: Jan. 8, 2020

(87) PCT Pub. No.: WO2019/021353
PCT Pub. Date: Jan. 31, 2019

(65) Prior Publication Data
US 2020/0147518 A1  May 14, 2020

(51) Int. Cl.
*B01D 15/36* (2006.01)
*B01D 61/46* (2006.01)
(Continued)

(52) U.S. Cl.
CPC ........... *B01D 15/367* (2013.01); *B01D 61/46* (2013.01); *B01D 65/02* (2013.01); *G01N 30/02* (2013.01);
(Continued)

(58) Field of Classification Search
CPC ...... B01D 15/367; B01D 61/46; B01D 65/02; G01N 30/02; G01N 2030/027; G01N 2030/645; G01N 2030/965
See application file for complete search history.

(56) References Cited

U.S. PATENT DOCUMENTS 3,897,213 A  7/1975 Stevens et al.
3,920,397 A  11/1975 Small et al.
(Continued)

FOREIGN PATENT DOCUMENTS

JP   2013195301 A  *  9/2013  ............. G01N 30/96
WO   00/42426 A1       7/2000
(Continued)

OTHER PUBLICATIONS

JP2013195301, machine translation.*
(Continued)

*Primary Examiner* — Benjamin L Lebron
(74) *Attorney, Agent, or Firm* — Maier & Maier, PLLC

(57) ABSTRACT

An ion suppressor includes ion exchange membranes between a pair of electrodes. Regeneration liquid channels are provided in the spaces between the electrodes and the ion exchange membranes, and an eluent channel is provided between the ion exchange membranes. Ion re-exchange in the eluent on the downstream side of the eluent channel is suppressed, thereby making it possible to improve the detection sensitivity for the ion to be measured. For example, the eluent channel has a folded structure, thereby increasing the amount of current on the downstream side of the eluent channel, and thus, the accumulation of ions is suppressed, and accordingly, ion re-exchange in the eluent can be suppressed.

13 Claims, 7 Drawing Sheets

(51) Int. Cl.
  *B01D 65/02* (2006.01)
  *G01N 30/02* (2006.01)
  *G01N 30/96* (2006.01)
  *G01N 30/64* (2006.01)
(52) U.S. Cl.
  CPC ....... *G01N 30/96* (2013.01); *G01N 2030/027* (2013.01); *G01N 2030/645* (2013.01); *G01N 2030/965* (2013.01)

(56) References Cited

U.S. PATENT DOCUMENTS

| | | | |
|---|---|---|---|
| 3,925,019 A | 12/1975 | Hamish et al. | |
| 3,926,559 A | 12/1975 | Stevens | |
| 4,999,098 A * | 3/1991 | Pohl | G01N 30/84 204/522 |
| 6,309,532 B1 * | 10/2001 | Tran | G01N 30/96 204/554 |
| 2010/0320132 A1 | 12/2010 | Sakamoto et al. | |

FOREIGN PATENT DOCUMENTS

| | | | |
|---|---|---|---|
| WO | 2009104262 A1 | 8/2009 | |
| WO | WO-2016098260 A1 * | 6/2016 | ............. G01N 30/02 |

OTHER PUBLICATIONS

WO2016/098260, machine translation.*
Japanese Office Action dated Dec. 1, 2020, in connection with corresponding JP Application No. 2019-532238 (6 pp., including machine-generated English translation).
International Search Report with English translation and Written Opinion with Machine translation dated Oct. 10, 2017 in corresponding International Application No. PCT/JP2017/026737; 12 pages.
Chinese Office Action dated May 7, 2022, in connection with corresponding CN Application No. 201780090845.6 (10 pp., including machine-generated English translation).

* cited by examiner

ION SUPPRESSOR AND ION CHROMATOGRAPH

FIELD

The present disclosure relates to an ion suppressor and an ion chromatograph.

BACKGROUND

In ion chromatography, ions in a sample are detected and quantified by introducing the sample into a separation column to separate the ions, and then guiding an eluent from the separation column to an electric conductivity meter to measure the electric conductivity. In suppressor-type ion chromatograph, with a suppressor disposed between a separation column and an electric conductivity meter, the electric conductivity of an eluent is decreased by electrodialysis to allow high-sensitivity measurements.

FIG. 8 is an exploded perspective view illustrating a configuration example of an ion suppressor. The ion suppressor 201 includes two ion exchange membranes 241 and 243 between a cathode 221 and an anode 223. Regeneration liquid channel supports 231 and 233 are disposed respectively between the cathode 221 and the ion exchange membrane 241 and between the anode 223 and the ion exchange membrane 243. An eluent channel support 260 is disposed between the two ion exchange membranes 241 and 243. Openings 231a and 233a are provided in the surfaces of the regeneration liquid channel supports 231 and 233, respectively. The eluent channel support 260 is provided with an opening 260a. The openings 231a, 233a, and 260a provided in these supports are provided with a mesh material through which liquids can pass, thereby preventing contact between the ion exchange membranes and the electrodes and contact between the ion exchange membranes.

The cathode 221, the anode 223, the regeneration liquid channel supports 231 and 233, the ion exchange membranes 241 and 243, and the eluent channel support 260 are each provided with through holes for passing bolts 291 and 292 therethrough. These constituent members are sandwiched from above and below by holders 211 and 213 and fixed by the bolts 291 and 292, thereby assembling the ion suppressor 201 shown in the cross-sectional view of FIG. 9.

The anode 221 is provided with regeneration liquid passage holes 221c at two sites, and the cathode 223 is provided with regeneration liquid passage holes 223c at two sites. The regeneration liquid introduced from a regeneration liquid introduction hole 211c1 of the holder 211 passes through one regeneration liquid passage hole 221c1, and the regeneration liquid is then guided to the opening 231a of the regeneration liquid channel support 231. The opening 231a provided in the regeneration liquid channel support 231 disposed between the cathode 221 and the ion exchange membrane 241 constitutes a regeneration liquid channel 271. The regeneration liquid guided to the regeneration liquid channel 271 passes through the other regeneration liquid passage hole 221c2, and the regeneration liquid is then discharged from a regeneration liquid discharge hole 211c2 of the holder 211. Likewise, the regeneration liquid introduced from a regeneration liquid introduction hole 213c1 of the holder 213 passes through one regeneration liquid passage hole 223c1, and is then guided to a regeneration liquid channel 273, and the regeneration liquid passes through the other regeneration liquid passage hole 223c2, and is then discharged from a regeneration liquid discharge hole 213c2.

The cathode 221, the regeneration liquid channel support 231 and the ion exchange membrane 241 are provided respectively with eluent passage holes 221e, 231e, and 241e. The anode 223, the regeneration liquid channel support 233, and the ion exchange membrane 243 are provided respectively with eluent passage holes 223f, 233f, and 243f. The eluent from the separation column is introduced from an eluent introduction hole 211e of the holder 211 into the ion suppressor 201, passes through the eluent passage holes 221e, 231e, and 241e, and is guided to the opening 260a provided in the eluent channel support 260. The opening 260a provided in the eluent channel support 260 disposed between the two ion exchange membranes 241 and 243 constitutes an eluent channel 275. The eluent passing through the eluent passage hole 241e and guided to one end of the eluent channel 275 moves in the channel extending direction (x direction) to reach the other end of the eluent channel 275, and passes through the eluent passage holes 243f, 233f, and 223f, and the eluent is then discharged from the eluent discharge hole 213f of the holder 213, and guided to a detector (electric conductivity meter).

In the case of measuring anions by suppressor-type ion chromatography, cation exchange membranes are used as the ion exchange membranes 241 and 233. When a voltage is applied between the cathode 221 and the anode 223, $H^+$ is supplied from the ion exchange membrane 243 on the anode side to the eluent channel 275, and cations such as sodium ions and potassium ions in the eluent are exchanged for $H^+$. The cations in the eluent exchanged for $H^+$ move to the ion exchange membrane 241 on the cathode side. For example, in a case where a carbonate buffer is used as the eluent, cations (sodium ions, potassium ions, etc.) in the eluent are exchanged for hydrogen ions in the eluent channel 76, thereby converting carbonate ions in the eluent to a carbonic acid and converting hydroxide ions to water, and thus decreasing the electric conductivity. The ion suppressor 201 decreases the electric conductivity of the eluent, decreasing the background during the measurement with the electric conductivity meter. In addition, the counter ion of the anion to be measured is also exchanged for $H^+$. Since the electric conductivity of $H^+$ is about 7 times as high as the electric conductivity of sodium ion, the counter ion is exchanged for $H^+$, thereby resulting in high-sensitivity detection of the anion to be measured.

In the electric regeneration-type ion suppressor, water or an eluent discharged from the detector is introduced as the regeneration liquid into the regeneration liquid channels 271 and 273. In the regeneration liquid channel 273 between the anode 223 and the ion exchange membrane 243, $H^+$ and $O_2$ are produced by electrolysis of water. In the regeneration liquid channel 271 between the cathode 221 and the ion exchange membrane 241, $OH^-$ and $H_2$ are produced by electrolysis of water. The $H^+$ produced in the regeneration liquid channel 273 on the anode side moves to the ion exchange membrane 243. The cation moving from the eluent channel 275 to the ion exchange membrane 241 moves to the regeneration liquid channel 271 on the cathode side, and serves as a counter ion of $OH^-$. In this way, the regeneration liquid is allowed to flow through the regeneration liquid channels 271 and 273 separated by the eluent channel 275 and the ion exchange membranes 241 and 233, thereby maintaining the balance of ions entering and exiting the ion exchange membrane, and thus electrochemically regenerating ion-exchange functional groups.

Patent Document 1 proposes that, in the eluent channel 275 of the ion suppressor 201, the resistance on the upstream side (the side close to the eluent introduction hole 211e) is relatively made lower than that on the downstream side (the side close to the eluent discharge hole 2130. The eluent on the upstream side of the eluent channel has a large ion amount to be exchanged, whereas the ion exchange is almost completed on the downstream side of the eluent channel, with a small ion amount to be exchanged. Accordingly, the upstream side is made relatively low in resistance to increase the amount of current, thereby improving current efficiency.

PRIOR ART DOCUMENTS

Patent Documents

Patent Document 1: WO 00/42426

SUMMARY

Problems to be Solved by the Invention

As described in Patent Document 1, when the amount of current on the upstream side of the eluent channel is relatively increased, the current efficiency is improved, but the detection sensitivity of the ion to be measured may be decreased in some cases, with the use of the ion suppressor. In view of the foregoing problem, an object of the present invention is to provide an ion suppressor capable of improving the detection sensitivity for an ion to be measured.

As a result of studies by the present inventors, it has been found that ion re-exchange in the eluent on the downstream side of the eluent channel is a cause of the decrease in detection sensitivity, associated with the use of the ion suppressor. Based on this finding, an ion suppressor according to the present invention suppresses ion re-exchange on the downstream side of an eluent channel, thereby making it possible to improve the detection sensitivity for an ion to be measured.

The ion suppressor according to the present invention includes a first ion exchange membrane and a second ion exchange membrane between a pair of electrodes of a first electrode and a second electrode. An eluent channel for allowing passage of an eluent from a separation column of an ion chromatograph is provided in the space between the first ion exchange membrane and the second ion exchange membrane. A first regeneration liquid channel for allowing passage of a regeneration liquid that regenerates the first ion exchange membrane is provided in the space between the first electrode and the first ion exchange membrane, and a second regeneration liquid channel for allowing passage of a regeneration liquid that regenerates the second ion exchange membrane is provided in the space between the second electrode and the second ion exchange membrane.

According to a first aspect of the present invention, the eluent channel has a folded structure, where an introduction part for introducing the eluent from the separation column into the eluent channel and a discharge part for discharging the eluent from the eluent channel are thus disposed close to each other. For example, a third ion exchange membrane is provided between the first ion exchange membrane and the second ion exchange membrane, thereby forming a first eluent channel between the first ion exchange membrane and the third ion exchange membrane, and forming a second eluent channel between the second ion exchange membrane and the third ion exchange membrane. The first eluent channel and the second eluent channel are connected via an opening provided in the third ion exchange membrane, thereby causing the first eluent channel and the second eluent channel to constitute the folded structure.

The eluent channel has the folded structure, thereby making the amount of current on the upstream of the eluent channel equal to that on the downstream of the eluent channel, and the accumulation of ions on the downstream is suppressed, thereby allowing ion re-exchange to be suppressed.

According to a second embodiment of the present invention, a shielding membrane is provided in contact with each of the first ion exchange membrane and the second ion exchange membrane, thereby preventing contact between the discharge part of the eluent channel and the ion exchange membranes. According to this embodiment, the adsorption of impurity ions to the ion exchange membranes is suppressed by preventing contact between the ion exchange membranes and the eluent in a region where the amount of current is small (a region where almost no current flows), and accordingly, ion re-exchange can be suppressed.

The ion suppressor according to the present invention is disposed for use between a separation column of an ion chromatograph and an electric conductivity meter. Ion re-exchange in the eluent on the downstream side of the eluent channel of the ion suppressor is suppressed, thereby making it possible to improve the detection sensitivity for the ion to be measured.

DETAILED DESCRIPTION

Figure 1:
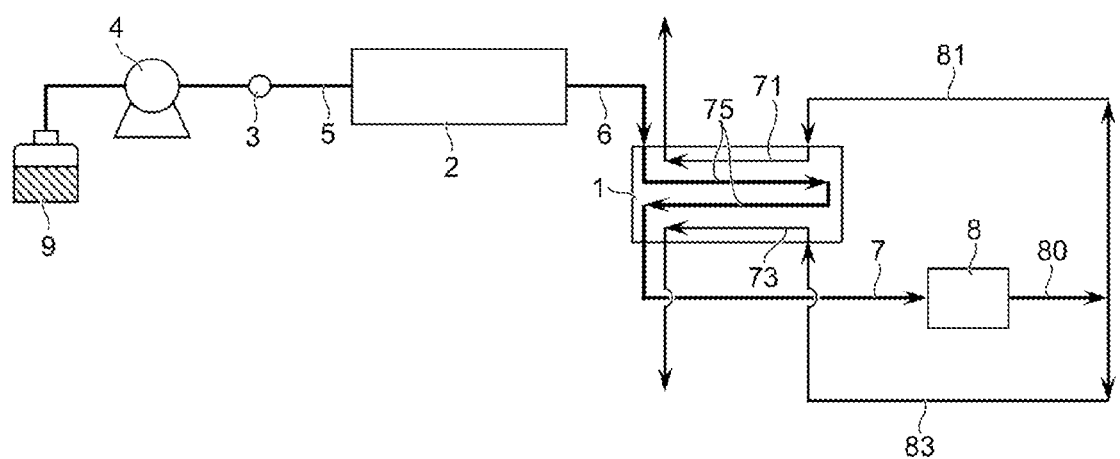
FIG. 1 is a schematic diagram illustrating a configuration example of suppressor-type ion chromatograph.

FIG. 1 is a schematic diagram illustrating a configuration example of suppressor-type ion chromatograph. A liquid feeding channel 5 provided with a liquid feeding pump 4 for supplying an eluent 9 is connected to a separation column 2. An injection unit 3 for injecting a sample to be analyzed is disposed in the middle of the liquid feeding channel 5. The sample injected into the separation column 2 is separated into respective ions in the separation column 2, and the eluent from the separation column 2 is guided to the eluent channel 75 of the ion suppressor 1 through a channel 6. The eluent which has an electric conductivity decreased due to the ion exchange in the ion suppressor 1 is guided from a channel 7 to an electric conductivity meter 8, and ions in the liquid are detected by the measurement of the electric conductivity. The eluent passing through the electric conductivity meter 8 is discharged to a channel 80. The channel 80 is divided into two channels, and the eluents from the channels 81 and 83 are, as regeneration liquids for regenerating the ion exchange membranes, introduced into the regeneration liquid channels 71 and 73 of the ion suppressor 1.

FIRST EMBODIMENT

In an ion suppressor according to the first embodiment of the present invention, an eluent channel has a folded structure, and an introduction part that guides an eluent into the eluent channel and a discharge part for discharging an eluent which has an electric conductivity decreased by electrodialysis are disposed close to each other.

Figure 2:
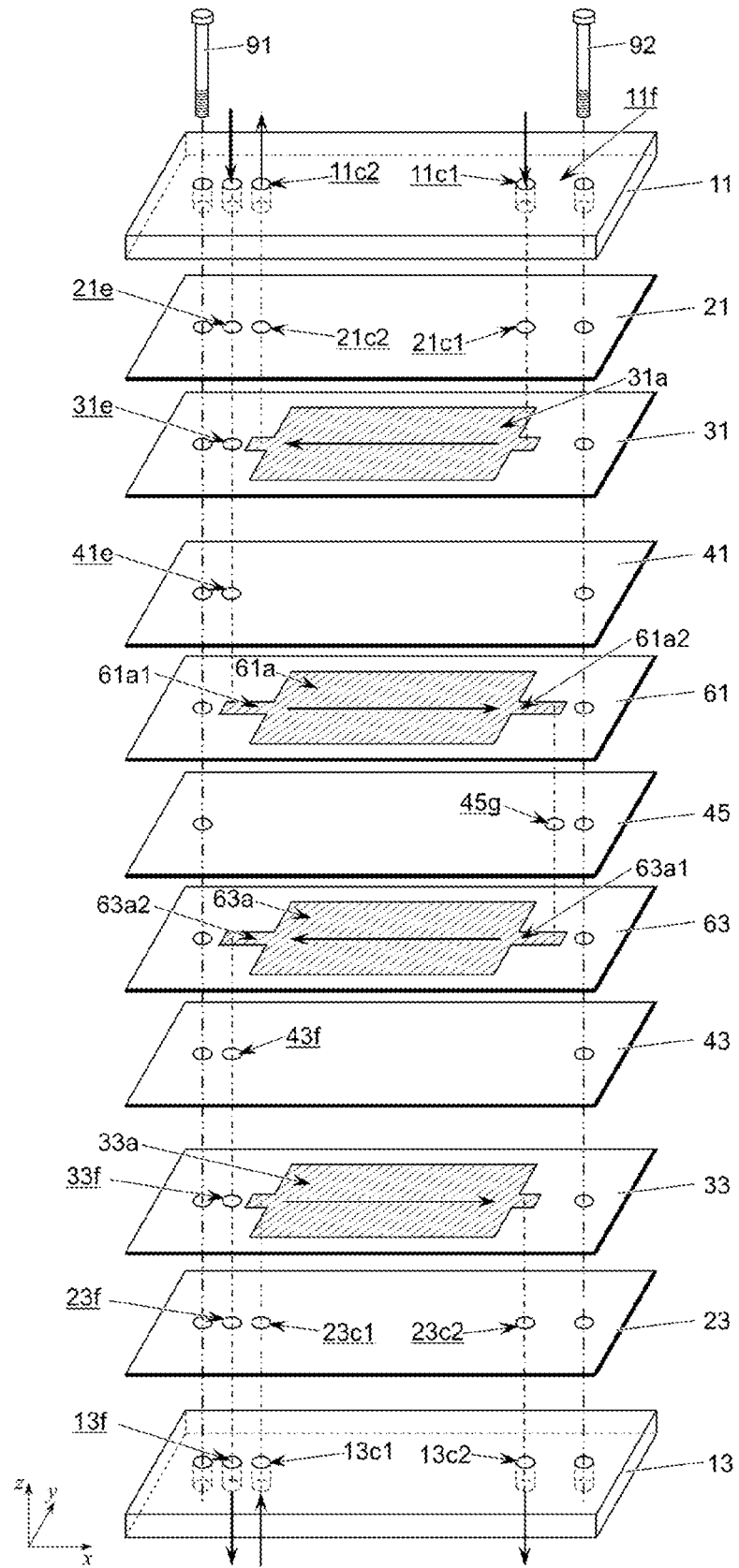
FIG. 2 is an exploded perspective view illustrating the configuration of an ion suppressor according to one embodiment.
Figure 3:
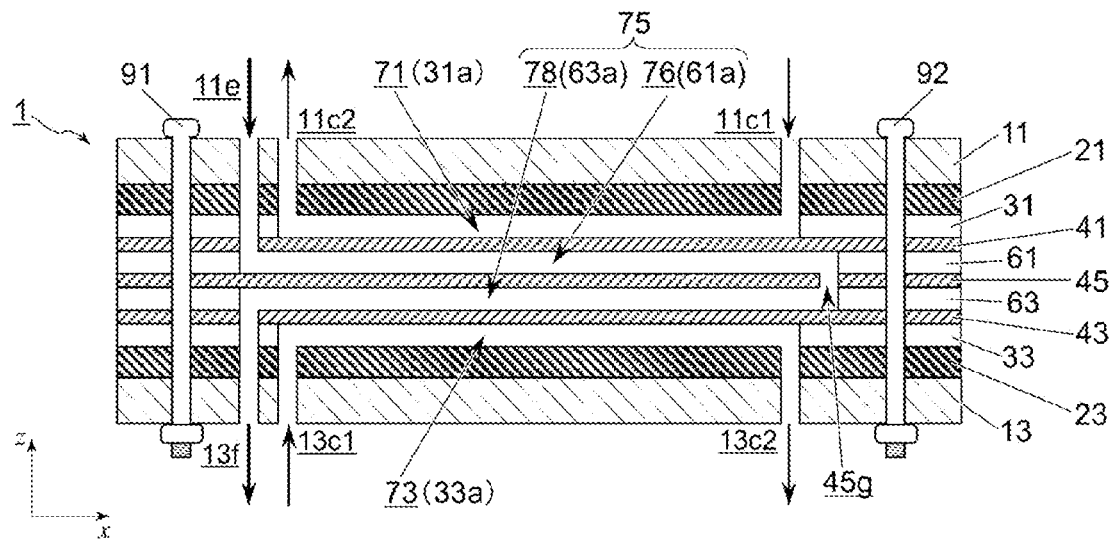
FIG. 3 is a cross-sectional view of an ion suppressor according to one embodiment.

FIG. 2 is an exploded perspective view illustrating the configuration of an ion suppressor according to one embodiment, and FIG. 3 is a cross-sectional view of the ion suppressor assembled. The ion suppressor 1 includes a first ion exchange membrane 41 and a second ion exchange membrane 43 between a cathode 21 as a first electrode and an anode 23 as a second electrode. A first regeneration liquid channel 71 is provided between the cathode 21 and the first ion exchange membrane 41, and a second regeneration liquid channel 73 is provided between the anode 23 and the second ion exchange membrane 43.

An eluent channel 75 is provided between the first ion exchange membrane 41 and the second ion exchange membrane 43. The eluent channel 75 includes a first eluent channel 76 and a second eluent channel 78 that are separated from each other by a third ion exchange membrane 45. The first eluent channel 76 and the second eluent channel 78 are connected to each other through an eluent passage hole 45g provided in the third ion exchange membrane 45.

Between the cathode 21 and the first ion exchange membrane 41, a first regeneration liquid channel support 31 is disposed, and between the anode 23 and the second ion exchange membrane 43, a second regeneration liquid channel support 33 is disposed. The first regeneration liquid channel support 31 is provided with an opening 31a, and the second regeneration liquid channel support 33 is provided with an opening 33a. The space formed by the wall surface of the opening 31a of the first regeneration liquid channel support 31 and the cathode 21 and first ion exchange membrane 41 provided above and below the first regeneration liquid channel support 31 forms the first regeneration liquid channel 71. The space formed by the wall surface of the opening 33a of the second regeneration liquid channel support 33 and the anode 23 and second ion exchange membrane 43 provided above and below the second regeneration liquid channel support 33 forms the second regeneration liquid channel 73.

Between the first ion exchange membrane 41 and the third ion exchange membrane 45, a first eluent channel support 61 is disposed, and between the second ion exchange membrane 43 and the third ion exchange membrane 45, a second eluent channel support 63 is disposed. The first eluent channel support 61 is provided with an opening 61a, and the second eluent channel support 63 is provided with an opening 63a. The space formed by the first ion exchange membrane 41 and third ion exchange membrane 45 provided above and below the first eluent channel support 61 forms the first eluent channel 76. The space formed by the second ion exchange membrane 43 and third ion exchange membrane 45 provided above and below the second eluent channel support 63 forms the second eluent channel 78.

In the ion suppressor 1, the cathode 21, the first regeneration liquid channel support 31, the first ion exchange membrane 41, the first eluent channel support 61, the third ion exchange membrane 45, the second eluent channel support 63, the second ion exchange membrane 43, the second regeneration liquid channel support 33, and the anode 23 are sandwiched between a cathode side holder 11 and an anode side holder 13 and fixed by bolts 91, 92, and the like.

The holders 11 and 13 are formed from a material that is inactive against adsorption and elution of ions, and for the material, for example, a resin material is used, such as acrylic or polyetheretherketone (PEEK). The regeneration liquid channel supports 31 and 33 and the eluent channel supports 61 and 63 are also formed from materials that are inactive against adsorption and elution of ions. These supports form channels, and serve as gaskets in close contact with an ion exchange membrane or an electrode disposed adjacently. Accordingly, the materials of the regeneration liquid channel supports 31 and 33 and the eluent channel supports 61, 63 preferably have liquid tightness, and for the materials, polyolefins such as polyethylene and polypropylene; rubber-based materials such as silicone rubbers; engineering plastics such as PEEK, and fluorine-based materials such as polytetrafluoroethylene (PTFE) are used, for example.

The eluent channel supports 61 and 63 preferably have a durometer D hardness of 30 or more, more preferably 40 or more in accordance with JIS K 7215:1986. In a case where the channel support has high hardness, the channel support is not likely to be deformed even in the case of an eluent flow at a high pressure, thus allowing any liquid leakage to be prevented. From the viewpoint of liquid leakage prevention, the regeneration liquid channel supports 31 and 33 preferably have a D hardness of 30 or more, more preferably 40 or more.

The eluent channel supports 61 and 63 preferably have a softening temperature 40° C. or higher, more preferably 50° C. or higher, even more preferably 60° C. or higher in accordance with JIS K 7206:2016. In a case where the eluent channel support has a high softening temperature, the channel support is not likely to be deformed even when a high-temperature liquid is allowed to flow through the channel, thereby allowing any liquid leakage to be prevented. Thus, the ion suppressor and chromatograph are allowed to be used at high temperatures. In order to allow the ion suppressor to operate at a high temperature, the regeneration liquid channel supports 31 and 33 also preferably have the softening temperature mentioned above.

Since the electric conductivity increases depending on the temperature, operating the ion chromatograph at a high temperature improves the detection sensitivity of ions to be analyzed in the electric conductivity meter 8, thereby allowing a higher sensitivity analysis. Also, since the ion diffusion rate is high at high temperatures, the applied voltage during the ion suppressor operation can be kept low, and the ion exchange membrane and the like can be thus kept from being degraded.

The openings 31a and 33a which serve as channels for the regeneration liquid and the openings 61a and 63a which serve as channels for the eluent have only to allow liquid to pass therethrough. These openings may be provided with a mesh material such as a screen. As the mesh material, a material that has an ion exchange function is used. The openings 31a and 33a of the regeneration liquid channel supports 31 and 33 are filled with the mesh material, thereby making it possible to prevent contact between the electrodes 21 and 31 and the ion exchange membranes 41 and 43. The openings 61a and 63a of the eluent channel supports 61 and 63 are filled with the mesh material, thereby making it possible to prevent contact between the ion exchange membranes. In a case of providing the opening of the channel support with the mesh material, the mesh material may be joined to the wall surface of the opening, or the mesh material may be bonded to the main surface of a substrate by gluing or the like so as to cover an opening of the substrate. Alternatively, the mesh material may be sandwiched and fixed between the two substrates. Two or more mesh materials may be laminated and used. The openings of the channel supports may be filled with beads made of an ion exchange resin or the like, instead of the mesh material.

The openings 31a and 33a and the openings 61a and 63a have wide regions in central parts in the x direction. In the ion suppressor, mainly in the wide regions, ion exchange by electrodialysis is performed. The central wide regions of the openings 31a and 33a and openings 61a and 63a preferably have the same shape and size. The openings 31a and 33a and the openings 61a and 63a are provided with narrow regions (channel regions) so as to protrude from the wide regions toward both ends in the x direction. The ion suppressor is configured such that liquid is moved through the channel regions between the regions and the outside of the ion suppressor and between regions and other channels. The shapes and sizes of the channel regions are adjusted in accordance with the liquid movement paths. Thus, the channel regions provided at both ends of each opening may be different in size and shape.

The thicknesses of the regeneration liquid channel supports 31 and 33 are, for example, 50 to 300 μm. The thicknesses of the eluent channel supports 61 and 63 are, for example, approximately 50 to 300 μm. The depths of the channels can be adjusted on the basis of the thicknesses of the channel supports.

The cathode 21 and the anode 23 are formed from, for example, metal materials. As the metal for the anode 23, Ti, Pt, Ir or the like is suitably used. As the metal for the cathode 21, SUS or the like is suitably used. The materials for the cathode 21 and the anode 23 are not limited to the foregoing materials, and Au, Pd, Ru, Rh, Ag, and alloys thereof may be used. The thicknesses of the cathode 21 and the anode 23 may be any thickness that operates as an electrode, and are, for example, approximately 500 to 2000 μm. The holder 11 and the cathode 21 may be formed integrally, and the holder 13 and the anode 23 may be formed integrally.

The first ion exchange membrane 41 and the second ion exchange membrane 43 may be a cation exchange membrane or an anion exchange membrane. In the case of measuring anions by ion chromatography, a cation exchange membrane is used. In a case where the first ion exchange membrane 41 and the second ion exchange membrane 43 are cation exchange membranes, the third ion exchange membrane 45 that separates the first eluent channel 76 and the second eluent channel 78 is also a cation exchange membrane.

As the cation exchange membrane, for example, a fluorine-based material is preferably used. Examples of the fluorine-based cation exchange resin include polymers in which perfluorocarbon has an acidic functional group such as a sulfo group or a carboxy group introduced therein, and commercially available cation exchange membranes may be used, such as Nafion. As the cation exchange membrane, a hydrocarbon-based material or the like can also be used. The thicknesses of the ion exchange membranes 41 and 43 are, for example, approximately 0.1 to 0.5 mm. As the ion exchange membranes 41 and 43, two or more ion exchange membranes may be laminated and used.

The eluent from the separation column 2 is introduced from the eluent introduction hole 11e provided in the holder 11, into the ion suppressor 1 through the channel 6. The eluent passes through the eluent passage hole 21e provided in the cathode 21, the eluent passage hole 31e provided in the regeneration liquid channel support 31, and the eluent passage hole 41e provided in the first ion exchange membrane 41, and the eluent is then guided into the first eluent channel 76 from the introduction channel 61a1 provided at one end of the opening 61a of the first eluent channel support 61.

The eluent introduced from the introduction channel moves through the first eluent channel 76 in the x direction. The eluent reaching the discharge channel 61a2 provided at the other end of the opening 61a is guided from the introduction channel 63a1 provided at one end of the opening 63a of the second eluent channel support 63, into the second eluent channel 78, through the eluent passage hole 45g provided in the third ion exchange membrane 45. In the second eluent channel 78, the eluent moves in the x direction toward the side opposite to the moving direction in the first eluent channel 76. The eluent reaching the discharge channel 63a2 provided at the other end of the opening 63a is discharged from the eluent passage hole 43f provided in the second ion exchange membrane 43 to the outside of the second eluent channel 78.

According to this embodiment, the introduction channel 61a1 at one end of the first eluent channel serves as an introduction part of the eluent channel, and the discharge channel 61a2 at the other end thereof serves as an eluent transfer part in contact with the eluent passage hole 45g for moving the second eluent channel from the first eluent channel. The discharge channel 63a2 at one end of the second eluent channel serves as a discharge part of the eluent channel, and the introduction channel 63a1 at the other end thereof serves as an eluent receiving part that receives the eluent from the first eluent channel. The discharge channel 61a2 of the first eluent channel, the introduction channel 63a1 of the second eluent channel, and the passage hole 45g of the third ion exchange membrane 45 are disposed such that the coordinates in the x direction and the y direction coincide with each other.

The regeneration liquid is introduced from the regeneration liquid introduction hole 11c1 of the holder 211 and the regeneration liquid introduction hole 13c1 of the holder 213. The regeneration liquid introduced from the regeneration liquid introduction hole 11c1 passes through the regeneration liquid passage hole 21c1 provided in the cathode 21, and the regeneration liquid is then introduced into the first regeneration liquid channel 71 from the introduction channel 31a1 provided at one end of the opening 31a of the first regeneration liquid channel support 31. The regeneration liquid is discharged from a discharge channel 31a2 provided at the other end of the opening 31a to the outside of the channel, and through the regeneration liquid passage hole 21c2, the regeneration liquid is discharged from the regeneration liquid discharge hole 11c2. The regeneration liquid introduced from the regeneration liquid introduction hole 13c1 of the holder 13 is guided to the second regeneration liquid channel 73, and then discharged from the regeneration liquid discharge hole 13c2. In the case of using the eluent passing through the electric conductivity meter 8 as the regeneration liquid, the regeneration liquid (the eluent after electric conductivity measurement) is introduced from the regeneration liquid channels 71 and 73 into the regeneration liquid introduction holes 11c1 and 13c1 of the ion suppressor 1 as shown in FIG. 1.

With a voltage applied between the cathode 21 and the anode 23, ion suppression is performed by allowing the eluent to flow through the eluent channel 75, and allowing the regeneration liquid to flow through the regeneration liquid channels 71 and 73 located above and below the eluent channel 75. In the second regeneration liquid channel 73 between the anode 23 and the second ion exchange membrane 43, $H^+$ and $O_2$ are produced by electrolysis of water. In the first regeneration liquid channel 71 between the cathode 21 and the first ion exchange membrane 41, $OH^-$ and $H_2$ are produced by electrolysis of water.

In a case where the first ion exchange membrane 41 and the second ion exchange membrane 43 are cation exchange membranes, the $H^+$ produced in the second regeneration liquid channel 73 permeates the second ion exchange membrane 43, and then moves into the second eluent channel 78. The $H^+$ moving from the second regeneration liquid channel 73 to the second eluent channel 78 is exchanged for cations such as sodium ions or potassium ions in the eluent. The $H^+$ moving to the second eluent channel 78 is also exchanged for the counter ion of the anion to be measured. The cation exchanged for $H^+$ passes through the third ion exchange membrane 45, and moves into the first eluent channel 76. The $H^+$ which is not exchanged for the cation in the eluent in the second eluent channel 78 also penetrates the third ion exchange membrane 45, and then moves into the first eluent channel 76.

The $H^+$ moving into the first eluent channel 76 is exchanged for cations in the eluent or the counter ion of the anion to be measured. The cations exchanged for $H^+$ permeate the first ion exchange membrane 41, and then move into the first regeneration liquid channel 71. The cations exchanged for $H^+$ in the second eluent channel 78, then moving into the first eluent channel 76, permeates the first ion exchange membrane 41 as they are, and moves to the first regeneration liquid channel 71.

In this way, the $H^+$ produced in the second eluent channel 78 closer to the anode 23 is exchanged for cations of the eluent flowing through the first eluent channel 76 and the second eluent channel 78. When the cation in the eluent is exchanged for $H^+$, the counter ion reacts with $H^+$. For example, the carbonate ion in the eluent is turned into a carbonic acid by the reaction with $H^+$, whereas the hydroxide ion in the eluent is converted to water by the reaction with $H^+$, thus decreasing the electric conductivity of the eluent. The cations of sodium, potassium, or the like, exchanged for $H^+$, permeate the first ion exchange membrane 41, and then move into the first regeneration liquid channel 71.

According to the present embodiment, the eluent channel 75 is composed of the two channels 76 and 78 separated by the third ion exchange membrane 45. The eluent introduced from the introduction channel 61a1 into the first eluent channel 76 moves through the first eluent channel 76 in the +x direction, the eluent is guided from the eluent passage hole 45g provided in the third ion exchange membrane 45 to the second eluent channel 78, the eluent moves through the second eluent channel 78 in the -x direction, and the eluent is discharged from the discharge channel 63a2. The eluent channel 75 has a folded structure, and the moving direction of the eluent in the first eluent channel 76 is opposite to the moving direction of the eluent in the second eluent channel 78. Thus, the introduction channel 61a1 which serves as an inlet of the eluent channel 75 and the discharge channel 63a2 which serves as an outlet of the eluent channel 75 are close in coordinates in the x direction.

In the eluent introduced into the eluent channel 75, the cations are exchanged for $H^+$ as the eluent travels along the channel. On the upstream side of the eluent channel 75 (near the introduction channel 61a1 of the first eluent channel 76), because of the concentration of cations which are not exchanged for $H^+$, the ion exchange rate between $H^+$ and the cations is relatively high. On the downstream side of the eluent channel 75 (near the discharge channel 63a2 of the second eluent channel 78), most of the cations have been already exchanged for $H^+$, and the ion exchange rate between $H^+$ and cations is thus relatively low.

Figure 9:
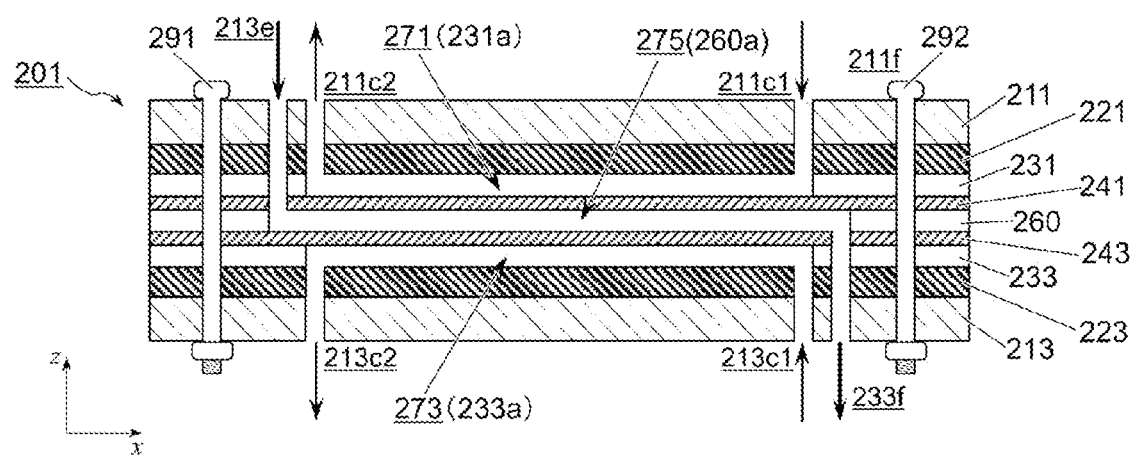
FIG. 9 is a cross-sectional view of the ion suppressor.

Even in the ion suppressor 201 of FIG. 9 in which the eluent channel has no folded structure, the ion exchange rate on the upstream side of the eluent channel 275 (the left-hand side in the figure) is relatively high, whereas the ion exchange rate on the downstream side of the eluent channel 275 (right-hand side in the figure) is relatively low. Thus, during the operation of the ion suppressor 201, the upstream amount of current is relatively large, whereas the downstream amount of current is relatively small.

In a region where the amount of current is small, ions are likely to be accumulated, and ions are likely to be adsorbed to the mesh material provided in the opening 260a of the eluent channel support 260 constituting the eluent channel 275. As the eluent flows through the eluent channel 275, the cations of the eluent are exchanged for $H^+$, but when cations are adsorbed on the mesh material on the downstream side where the current is small, the cations are exchanged again for $H^+$ of the eluent. The eluent with the cation re-exchanged for $H^+$ has the same condition as before the introduction into the ion suppressor 201. Thus, when the ions are re-exchanged, the effect of electric conductivity adjustment by the ion suppressor is lost, thereby decreasing the detection sensitivity for the ion to be measured.

According to the present embodiment, the eluent channel 75 has a folded structure, and the downstream region (near the discharge channel 63a2 of the second eluent channel 78) of the eluent channel 75 has the same coordinates in the x direction (eluent movement direction) as the upstream region (near the introduction channel 61a1 of the first eluent channel 76) of the eluent channel 75. The same coordinates in the direction orthogonal to the voltage application direction (z direction) mean the same amount of current, and the amount of current in the downstream region is thus equal to the amount of current in the upstream region.

More specifically, in the downstream region, the ion exchange rate is low because most of the cations in the eluent have already been exchanged for $H^+$, but the ion exchange rate in the upstream region is high, thus increasing the amount of current in the downstream region. The amount of current in the downstream region of the eluent channel is large, thereby suppressing the adsorption of ions to the mesh material due to ion accumulation. For this reason, in the downstream region of the eluent channel, the cations and the $H^+$ in the eluent are not likely to be exchanged again, and the detection sensitivity for the ion to be measured to be thus kept high.

As mentioned above, according to the first embodiment of the present invention, the eluent channel 75 has a folded structure, thereby bringing the inlet and the outlet of the eluent channel close to each other, and increasing the amount of current in the downstream region of the eluent channel. The amount of current in the downstream region is increased, thereby suppressing adsorption of ions to the mesh material or the like, and allowing the detection sensitivity to be prevented from being decreased due to re-ion exchange in the downstream region of the eluent channel.

The ion suppressor 1 shown in FIG. 3 is provided with the third ion exchange membrane 45 between the first ion exchange membrane 41 and the second ion exchange membrane 43 to form two eluent channels 76 and 78, thereby reciprocating the eluent once in the x direction in the eluent channel 75, and then bringing the inlet and outlet of the eluent channel close to each other. The number of eluent channels arranged in the vertical direction is not limited to two, as long as the number of channels is an even number. For example, four channels arranged in the vertical direction may be configured by providing another ion exchange membrane between the first ion exchange membrane 41 and the third ion exchange membrane 45 and providing yet another ion exchange membrane between the third ion exchange membrane 45 and the second ion exchange membrane 43, and the eluent may be reciprocated twice in the eluent channel.

In the ion suppressor 1 shown in FIG. 3, the eluent is introduced from the eluent passage hole 41e provided in the first ion exchange membrane 41 disposed close to the cathode 21, into the first eluent channel 76, and the eluent is discharged from the eluent passage hole 43f provided in the second ion exchange membrane 43 disposed close to the anode 23. Like the ion suppressor 101 shown in FIG. 4, the eluent may be introduced from the side with the first ion exchange membrane 41 into the first eluent channel 76, and the eluent reaching the downstream of the second eluent channel 78 may be allowed to pass through the passage holes provided in the third ion exchange membrane 45, the first eluent channel support 61, and the first ion exchange membrane 41, and then discharged from the eluent discharge hole 11f of the cathode side holder 11.

Figure 4:
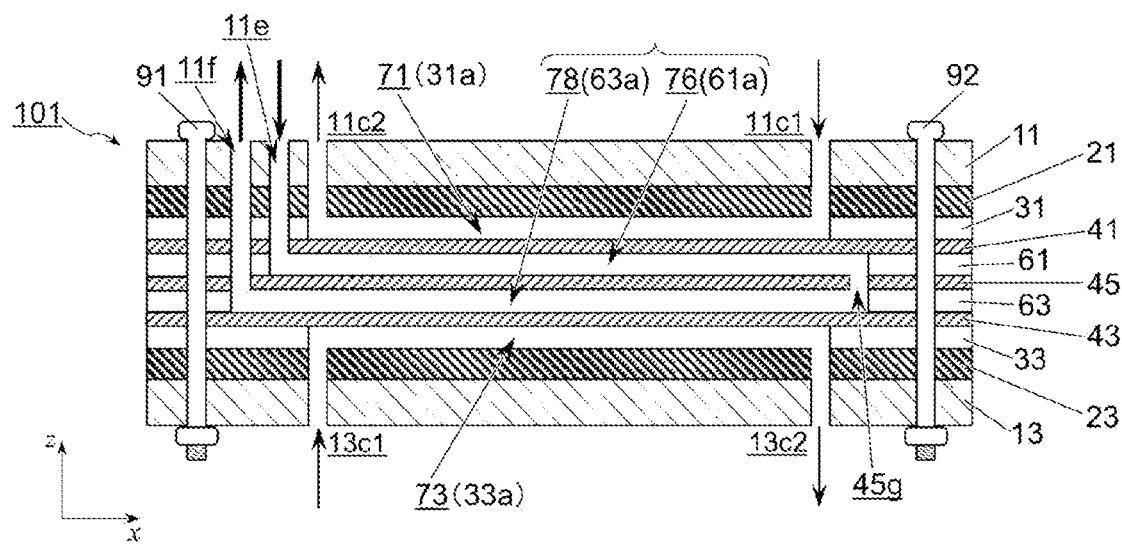
FIG. 4 is a cross-sectional view of an ion suppressor according to one embodiment.

In the ion suppressor according to the first embodiment shown in FIGS. 3 and 4, the flow direction of the eluent may be reversed. More specifically, the eluent may be introduced into the second eluent channel 78 adjacent to the anode 23, and the eluent may be discharged from the first eluent channel 76 adjacent to the cathode 21. As shown in FIGS. 3 and 4, the eluent is moved from the first eluent channel 76 adjacent to the cathode 21 to the second eluent channel 78 adjacent to the anode 23, thereby increasing the $H^+$ concentration in the downstream region of the eluent channel.

In a case where the eluent moves from the eluent channel 78 close to the anode 23 to the eluent channel 76 close to the cathode 21, the cations exchanged for $H^+$ in the eluent channel 78 on the anode side (upstream side) pass through the ion exchange membrane, and then move to the eluent channel 76 on the cathode side (downstream side), and the concentration of the cations exchanged for $H^+$ is thus increased in the downstream region. On the other hand, in a case where the eluent moves from the first eluent channel 76 close to the cathode 21 to the second eluent channel 78 close to the anode 23, the cations exchanged for $H^+$ in the first eluent channel 76 on the upstream side pass through the first ion exchange membrane 41, and move to the first regeneration liquid channel 71. Thus, $H^+$ and cations are less likely to be re-exchanged in the second eluent channel 78 on the anode side (downstream side), and the detection sensitivity for the ion to be measured tends to be improved. Accordingly, the ion chromatograph provided with the ion suppressor 1 according to the first embodiment of the present invention is preferably configured to introduce the eluent from the separation column 2 into the first eluent channel 76 closer to the cathode 21, and guide the eluent discharged from the second eluent channel 78 closer to the anode 23, to the electric conductivity meter 8.

Figure 8:
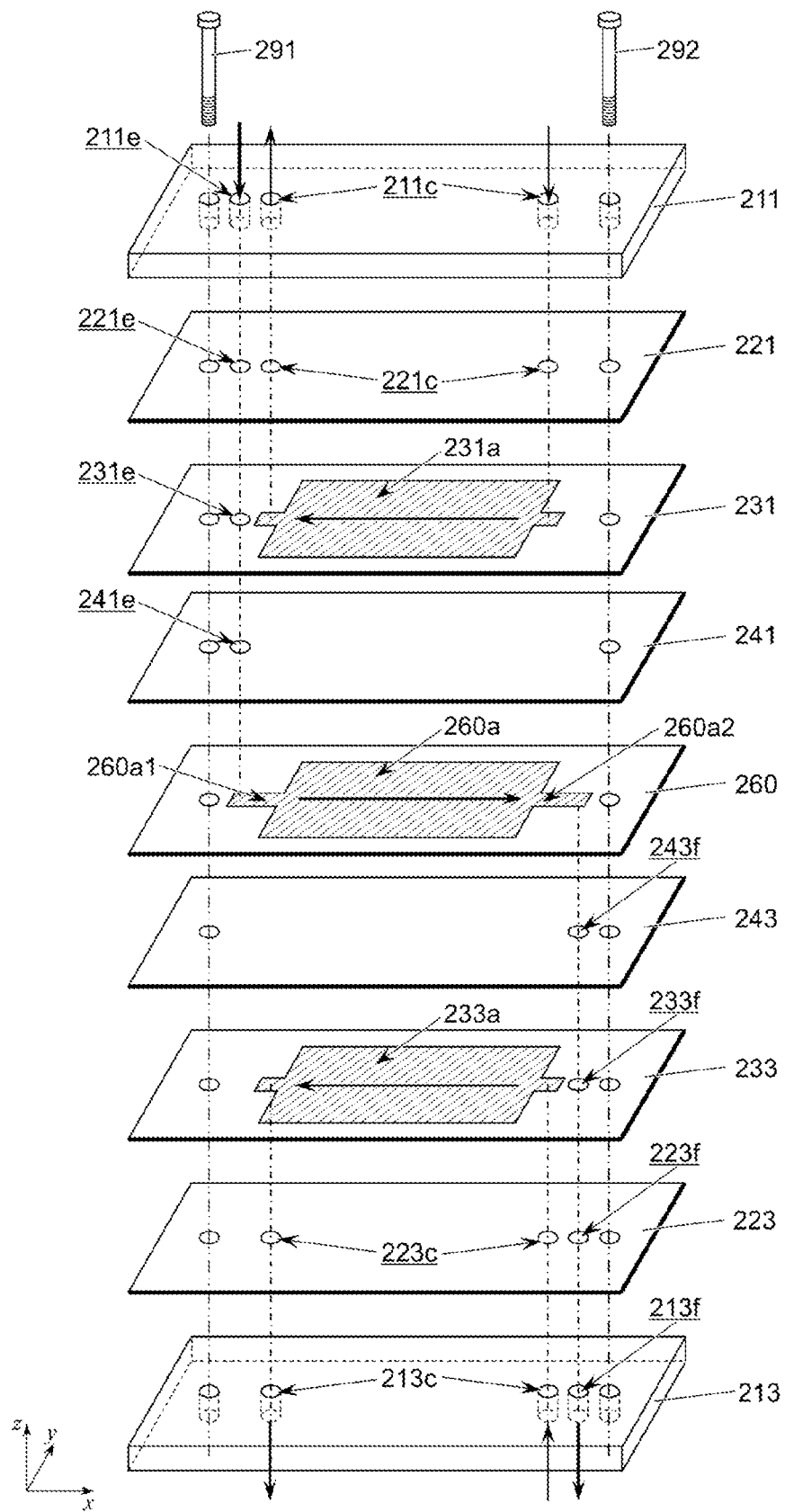
FIG. 8 is an exploded perspective view illustrating the configuration of an ion suppressor.

The detection sensitivity for cations was compared between a case of using the single-channel ion suppressor shown in FIGS. 8 and 9 (comparative example) and a case of using the ion suppressor including the channel that has the folded structure as shown in FIGS. 2 and 3 (example). With the use of a column for anion analysis (Sim-Pack IC-SA2) as the separation column of the ion chromatograph, for each of 1 ppm concentrations of fluoride ions, chloride ions, nitrite ions, bromide ions, nitrate ions, phosphate ions, and sulfate ions, 50 µL of the ions was injected, and an analysis was performed at a flow rate of 1 mL/min with the use of a carbonate buffer (12 mM $NaHCO_3$+0.6 mM $Na_2CO_3$) as the eluent. Table 1 shows the detection results for each ion (the electric conductivity measured with the electric conductivity meter: µS/cm).

TABLE 1

|  | $F^-$ | $Cl^-$ | $NO_2^-$ | $Br^-$ | $NO_3^-$ | $PO_4^{3-}$ | $SO_4^{2-}$ |
|---|---|---|---|---|---|---|---|
| Example (Folded Channel) | 3.6 | 2.0 | 1.0 | 0.6 | 0.7 | 0.2 | 0.5 |
| Comparative Example (Single Channel) | 3.3 | 1.9 | 0.8 | 0.6 | 0.7 | 0.2 | 0.5 |

From the results shown in Table 1, it is determined that in the case of using the ion suppressor that has the folded structure, the electric conductivity of the fluoride ions, chloride ions, and sulfite ions is higher as compared with the case of using the single-channel ion suppressor, in particular, the detection sensitivity is improved for anions which are short in elution time.

SECOND EMBODIMENT

As mentioned above, according to the first embodiment of the present invention, the eluent channel has a folded structure, thereby increasing the amount of current on the downstream side of the eluent channel, and suppressing ion re-exchange on the downstream side of the eluent channel. According to the second embodiment of the present invention, in a region where the amount of current is small, ion re-exchange in an eluent channel is suppressed by reducing the area where an ion exchange membrane and an eluent come into contact with each other.

Figure 5:
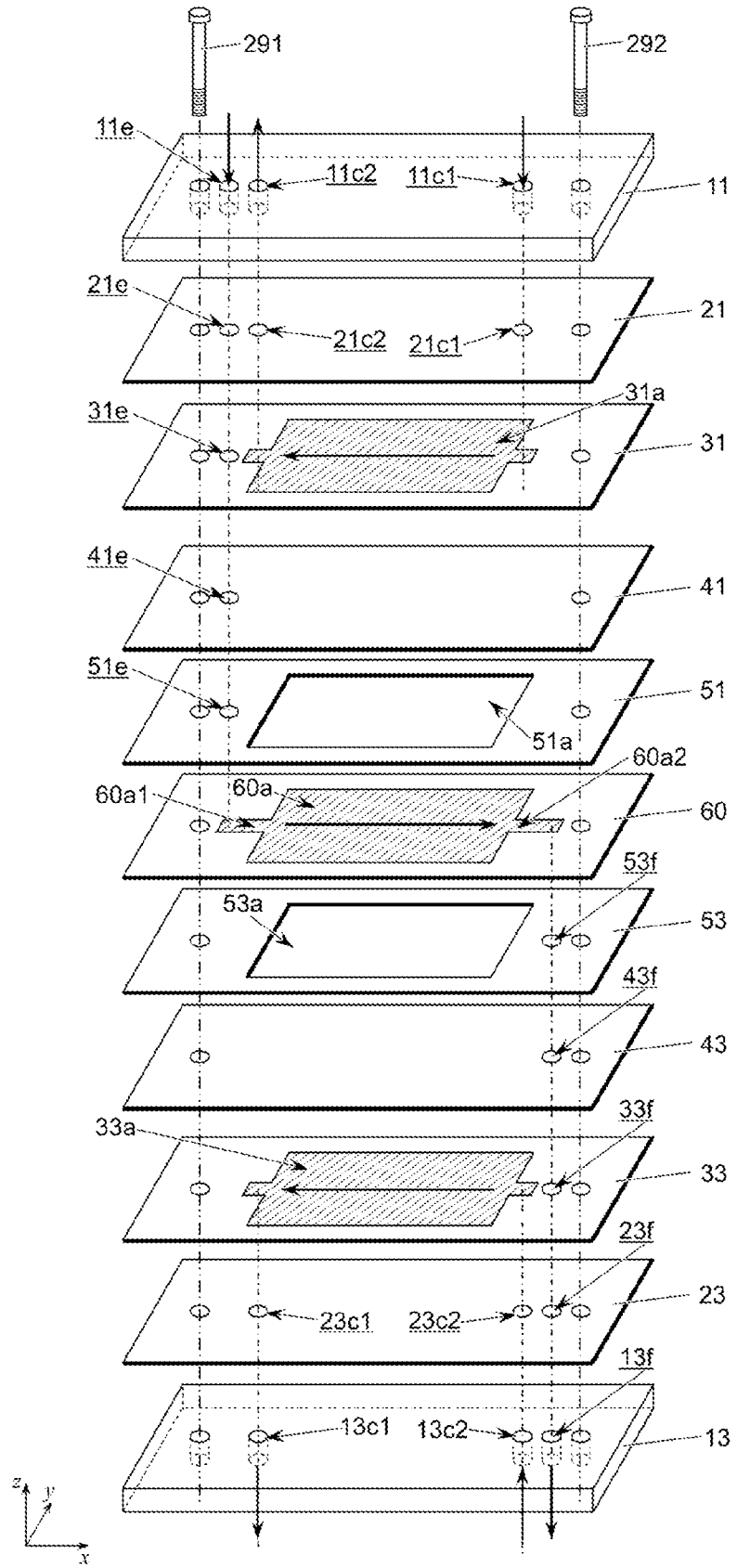
FIG. 5 is an exploded perspective view illustrating the configuration of an ion suppressor according to one embodiment.
Figure 6:
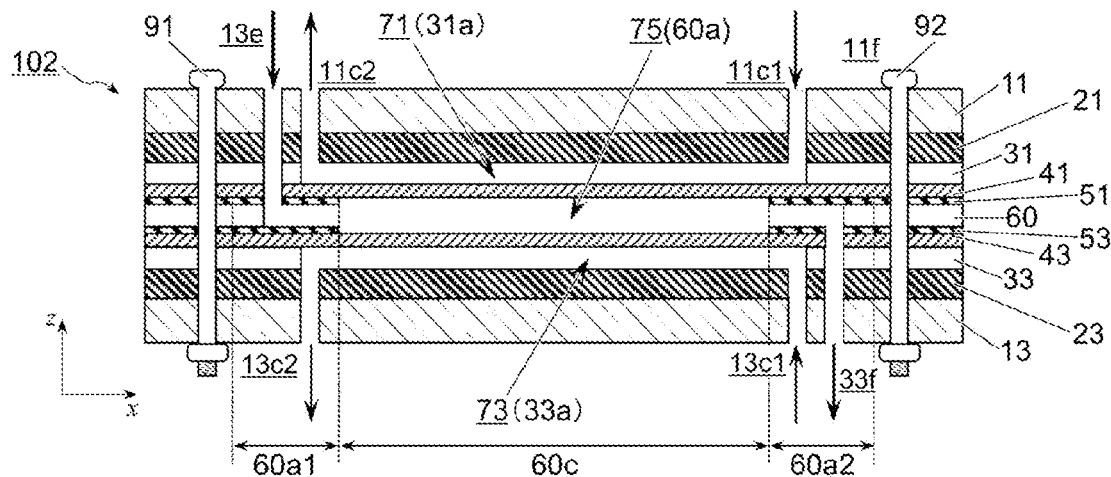
FIG. 6 is a cross-sectional view of an ion suppressor according to one embodiment.

FIG. 5 is an exploded perspective view illustrating the configuration of an ion suppressor according to one embodiment, and FIG. 6 is a cross-sectional view of the ion suppressor assembled. In the ion suppressor 102, an eluent channel support 60 is disposed between a first ion exchange membrane 41 and a second ion exchange membrane 42, and the eluent channel support 60 is provided with an opening 60a.

Between the first ion exchange membrane 41 and the eluent channel support 60, a first shielding membrane 51 is disposed. The first shielding membrane 51 is provided so as to cover an eluent introduction channel 60a1 and an eluent discharge channel 60a2 located at both ends of the opening 60a, thereby preventing contact between a mesh material provided in the eluent introduction channel 60a1 and the eluent discharge channel 60a2 and the first ion exchange membrane 41. The first shielding membrane 51 is provided with an eluent passage hole 51e at a position corresponding to an eluent passage hole 41e of the first ion exchange membrane 41, and configured to be capable of introducing the eluent into the eluent introduction channel 60a1.

Between the second ion exchange membrane 43 and the eluent channel support 60, a second shielding membrane 53 is disposed. As with the first shielding membrane 51, the second shielding membrane 53 is also provided so as to cover an eluent introduction channel 60a1 and an eluent discharge channel 60a2 located at both ends of the opening 60*a*, thereby preventing contact between a mesh material provided in the eluent introduction channel 60*a*1 and the eluent discharge channel 60*a*2 and the second ion exchange membrane 43. The second shielding membrane 53 is provided with an eluent passage hole 53*f* at a position corresponding to an eluent passage hole 43*f* of the second ion exchange membrane 43, and configured to be capable of discharging the eluent from the eluent discharge channel 60*a*2.

The first shielding membrane 51 is provided with an opening 51*a* at a position corresponding to the central part of an opening 31*a* of a first regeneration liquid channel support 31 and a wide region in the center of the opening 60*a* of the eluent channel support 60. The second shielding membrane 53 is provided with an opening 53*a* at a position corresponding to the central part of an opening 33*a* of a second regeneration liquid channel support 33 and a wide region in the center of the opening 60*a* of the eluent channel support 60. The openings 51*a* and 53*a* of the shielding membranes 51 and 53 are hollow. Thus, in the region where the openings 51*a* and 53*a* are provided, the first ion exchange membrane 41 and the second ion exchange membrane 43, and the eluent channel 75 (the mesh material provided in the opening 60*a*) can come into contact with each other.

This ion suppressor 102 has the same configuration as the ion suppressor 201 shown in FIGS. 8 and 9, except that shielding membranes 51 and 53 are disposed between the ion exchange membranes 41 and 43 and the eluent channel support 60. In the central part of the eluent channel 75, $H^+$ passing through the first ion exchange membrane 41 from the first regeneration liquid channel 71 is exchanged for cations in the eluate, and the cations exchanged for $H^+$ pass through the second ion exchange membrane 43, and then moves to the second regeneration liquid channel 73.

The shape and size of the wide region 60*c* in the center of the opening 60*a* of the eluent channel support 60 can be designed to be the same as the shape and size of the wide region in the center of the opening 31*a* of the first regeneration liquid channel support 31 and the shape and size of the wide region in the center of the opening 33*a* of the second regeneration liquid channel support 33. Thus, in the wide regions of the channels, ions are effectively exchanged between the eluent channel 75 and the regeneration liquid channels 71 and 73 through the ion exchange membranes 41 and 43.

On the other hand, in order to efficiently introduce and discharge the regeneration liquid and the eluent to and from the ion suppressor, the shapes and sizes of the channels 60*a*1 and 60*a*2 located at both ends of the opening 60*a* of the eluent channel support 60 are different from the shapes and sizes of the channels 31*a*1, 31*a*2, 33*a*1, and 33*a*2 located at both ends of the openings 31*a* and 33*a* of the regeneration liquid channel supports 31 and 33. In these channel sections, the channels are small in width, and furthermore, there is a region where the regeneration liquid channels are not provided above or below the eluent channels. Thus, ions are less likely to be exchanged in the eluent, and the amount of current is small. Accordingly, ions are more likely to be accumulated in the eluent introduction channel 60*a*1 and the eluent discharge channel 60*a*2.

As in the case of the ion suppressor 201 shown in FIG. 9, with the ion exchange membranes 241 and 243 in contact with the eluent introduction channel and the eluent discharge channel, impurity ions accumulated in the channels are adsorbed on the ion exchange membranes. When the impurity ions adsorbed on the ion exchange membranes are re-exchanged for $H^+$ of the eluent in the eluent channel 276, the detection sensitivity for the ion to be measured is decreased. In particular, when ions are re-exchanged in the eluent discharge channel 260*a*2, the eluent with ions re-exchanged passes through the eluent passage holes 243*f*, 233*f*, and 223*f*, and is then guided to the electric conductivity meter, which is likely to cause a decrease in detection sensitivity.

In the ion suppressor 102 shown in FIGS. 5 and 6, the first shielding membrane 51 and the second shielding membrane 53 are provided so as to cover the eluent introduction channel 60*a*1 and the eluent discharge channel 60*a*2 from both sides. Thus, contact between the eluent and the ion exchange membranes 41 and 43 in the channel region can be prevented to suppress adsorption of impurity ions to the ion exchange membranes, thereby allowing the detection sensitivity to be kept from being decreased due to ion re-exchange.

The materials for the shielding membranes 51 and 53 preferably has insulating performance and liquid tightness, and for the materials, polyolefins such as polyethylene and polypropylene; rubber-based materials such as silicone rubbers; and engineering plastics such as PEEK, and fluorine-based materials such as polytetrafluoroethylene (PTFE) are used, for example. The thicknesses of the shielding membranes 51 and 53 are not particularly limited, but if the thicknesses of the shielding membranes 51 and 53 are excessively large, the ion conductivity may be decreased due to defective contact between the mesh material of the eluent channel and the ion exchange membranes 41 and 43 in the central part 60*c* of the eluent channel, thereby decreasing the ion exchange efficiency in some cases. Accordingly, the thicknesses of the shielding membranes 51 and 53 are preferably 100 µm or less, more preferably 50 µm or less, further preferably 30 microns or less. In addition, the thicknesses of the shielding membranes 51 and 53 are preferably 1/5 or less, more preferably 1/10 or less of the thicknesses of the adjacent ion exchange membranes 41 and 43.

As described above, the re-exchange of ions in the eluent in the discharge channel provided at the downstream end of the eluent channel causes a decrease in detection sensitivity. On the other hand, even in a case where ions in the eluent are exchanged for ions adsorbed on the ion exchange membrane in the introduction channel at the upstream end of the eluent channel, electrodialysis is performed in the eluent channel to exchange impurity ions for $H^+$, and the detection sensitivity is thus not greatly affected. Accordingly, the shielding membranes 51 and 53 have only to be provided so as to cover the discharge channel 60*a*2 of the eluent channel, and do not have to cover the introduction channel 60*a*1.

The first embodiment and second embodiment of the present invention may be combined. For example, like the ion suppressor 103 shown in FIG. 7, an eluent channel 75 may have a folded structure composed of a first eluent channel 76 and a second eluent channel 78, and a shielding membrane 53 may be provided between a discharge channel of the second eluent channel 78 and a second ion exchange membrane 43. In this configuration, the amount of current on the downstream side of the second eluent channel 78 is equal to the amount of current on the upstream side of the first eluent channel 76, and the shielding membrane 53 prevents contact between a discharge channel 63*a*2 at the downstream end of the second eluent channel 78 and the second ion exchange membrane 43. Accordingly, impurity ions accumulated on the downstream side of the eluent channel and $H^+$ of the eluent are kept from being re-exchanged, thereby allowing the detection sensitivity of ion chromatography to be further improved.

Figure 7:
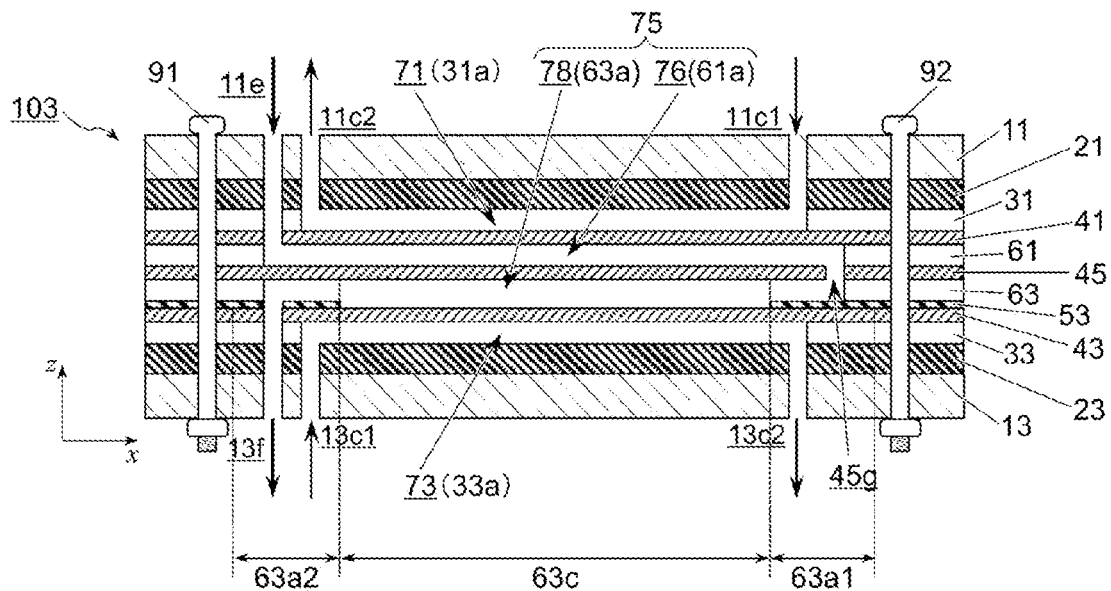
FIG. 7 is a cross-sectional view of an ion suppressor according to one embodiment.

In the ion suppressor 103 of FIG. 7, the shielding membrane 53 covers an introduction channel 63a1 at the upstream end of the second eluent channel 78 in addition to the discharge channel 63a2 at the downstream side of the second eluent channel 78, but the shielding membrane does not have to cover the introduction channel 63a1. Between the first ion exchange membrane 41 and a first eluent channel support 61, a shielding membrane may be provided. Furthermore, a shielding membrane may be also provided between the first eluent channel support 61 and a third ion exchange membrane 45 and/or between a second eluent channel support 63 and the third ion exchange membrane 45.

DESCRIPTION OF REFERENCE SIGNS 2 separation column
3 injection part
8 electric conductivity meter
1, 101, 102, 103 ion suppressor
11, 13 holder
21 electrode (cathode)
23 electrode (anode)
31, 33 regeneration liquid channel support
71, 73 regeneration liquid channel
41, 43, 45 ion exchange membrane
60, 61, 63 eluent channel support
75, 76, 78 eluent channel
51, 53 shielding plate

The invention claimed is:

1. An ion suppressor that exchanges ions in an eluent from a separation column of an ion chromatograph, the ion suppressor comprising:
a first ion exchange membrane and a second ion exchange membrane are disposed between a pair of electrodes of a first electrode and a second electrode,
an eluent channel for allowing passage of the eluent from the separation column of the ion chromatograph is provided in a space between the first ion exchange membrane and the second ion exchange membrane,
a first regeneration liquid channel for allowing passage of a regeneration liquid that regenerates the first ion exchange membrane is provided in a space between the first electrode and the first ion exchange membrane,
a second regeneration liquid channel for allowing passage of a regeneration liquid that regenerates the second ion exchange membrane is provided in a space between the second electrode and the second ion exchange membrane, and
the eluent channel has a folded structure, where an introduction part for introducing the eluent from the separation column into the eluent channel and a discharge part for discharging the eluent from the eluent channel are disposed close to each other;
wherein the folded structure comprises a third ion exchange membrane provided between the first ion exchange membrane and the second ion exchange membrane, and
the eluent channel comprises a first eluent channel between the first ion exchange membrane and the third ion exchange membrane, and a second eluent channel between the second ion exchange membrane and the third ion exchange membrane.

2. The ion suppressor according to claim 1, wherein the first eluent channel and the second eluent channel are connected via an opening provided in the third ion exchange membrane to form the folded structure.

3. The ion suppressor according to claim 2, wherein a first eluent channel support with an opening is disposed between the first ion exchange membrane and the third ion exchange membrane, and the opening provided in the first eluent channel support constitutes the first eluent channel,
a second eluent channel support with an opening is disposed between the second ion exchange membrane and the third ion exchange membrane, and the opening provided in the second eluent channel support constitutes the second eluent channel,
the first eluent channel is provided with the introduction part at one end in an eluent movement direction, and with an eluent transfer part for moving the eluent to the second eluent channel at the other end, and
the second eluent channel is provided with the discharge part at one end in the eluent movement direction, and with an eluent receiving part at a position corresponding to the eluent transfer part of the first eluent channel at the other end.

4. The ion suppressor according to claim 3, wherein a mesh material capable of allowing passage of a liquid is provided in each of the opening of the first eluent channel support and the opening of the second eluent channel support.

5. The ion suppressor according to claim 4, wherein the introduction part and eluent transfer part of the first eluent channel are narrower in channel width than a central part in the eluent movement direction, and
the eluent receiving part and discharge part of the second eluent channel are narrower in channel width than the central part in the eluent movement direction.

6. The ion suppressor according to claim 4, wherein a shielding membrane for preventing contact between the second ion exchange membrane and a mesh material provided on and near the discharge part is provided between the second eluent channel support and the second ion exchange membrane.

7. The ion suppressor according to claim 1, wherein the first ion exchange membrane and the second ion exchange membrane are cation exchange membranes.

8. The ion suppressor according to claim 7, wherein the first electrode is a cathode and the second electrode is an anode.

9. A chromatograph comprising:
a separation column that separates an ion to be measured;
an electric conductivity meter that measures an electric conductivity of an eluent from the separation column; and
the ion suppressor according to claim 1 in a channel between the separation column and the electric conductivity meter,
wherein the chromatograph is configured to introduce the eluent from the separation column into the introduction part of the eluent channel of the ion suppressor, and guide the eluent discharged from the discharge part to the electric conductivity meter.

10. An ion suppressor that exchanges ions in an eluent from a separation column of an ion chromatograph,
wherein a first ion exchange membrane and a second ion exchange membrane are disposed between a pair of electrodes of a first electrode and a second electrode,
a first regeneration liquid channel for allowing passage of a regeneration liquid that regenerates the first ion exchange membrane is provided in a space between the first electrode and the first ion exchange membrane, a second regeneration liquid channel for allowing passage of a regeneration liquid that regenerates the second ion exchange membrane is provided in a space between the second electrode and the second ion exchange membrane, an eluent channel support with an opening is disposed between the first ion exchange membrane and the second ion exchange membrane, a mesh material that allows passage of a liquid is provided in the opening provided in the eluent channel support, and the opening constitutes an eluent channel for allowing passage of the eluent from the separation column of the ion chromatograph, the eluent channel is provided with a discharge part for discharging the eluent from the eluent channel, at one end in an eluent movement direction, and a shielding membrane for preventing contact between a mesh material provided on and near the discharge part and the first ion exchange membrane and the second ion exchange membrane is provided each between the eluent channel support and the first ion exchange membrane and between the eluent channel support and the second ion exchange membrane.

11. The ion suppressor according to claim 10, wherein the eluent channel is provided with an introduction part for introducing the eluent from the separation column into the eluent channel at an end opposite to the discharge part in the eluent movement direction, and the shielding membrane is disposed to prevent contact between a mesh material provided on and near the introduction part and the first ion exchange membrane and the second ion exchange membrane.

12. The ion suppressor according to claim 10, wherein a thickness of the shielding membrane is $1/10$ or less of a thickness of the ion exchange membrane disposed adjacently.

13. A chromatograph comprising:

a separation column that separates an ion to be measured;

an electric conductivity meter that measures an electric conductivity of an eluent from the separation column;

the ion suppressor according to claim 10 in a channel between the separation column and the electric conductivity meter, wherein the chromatograph is configured to introduce the eluent from the separation column into the eluent channel of the ion suppressor, and guide the eluent discharged from the eluent channel to the electric conductivity meter.

* * * * *